United States Patent
Moyer et al.

(10) Patent No.: US 7,409,502 B2
(45) Date of Patent: Aug. 5, 2008

(54) SELECTIVE CACHE LINE ALLOCATION INSTRUCTION EXECUTION AND CIRCUITRY

(75) Inventors: William C. Moyer, Dripping Springs, TX (US); Jeffrey W. Scott, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 113 days.

(21) Appl. No.: 11/382,900

(22) Filed: May 11, 2006

(65) Prior Publication Data

US 2007/0266217 A1 Nov. 15, 2007

(51) Int. Cl.
G06F 12/12 (2006.01)
(52) U.S. Cl. ...................................... 711/134
(58) Field of Classification Search .................. 711/133, 711/134
See application file for complete search history.

(56) References Cited

U.S. PATENT DOCUMENTS

| | | | | |
|---|---|---|---|---|
| 5,603,004 A | * | 2/1997 | Kurpanek et al. | 711/118 |
| 5,606,687 A | * | 2/1997 | Mehring et al. | 711/139 |
| 5,680,578 A | * | 10/1997 | Dutton et al. | 711/154 |
| 5,689,679 A | | 11/1997 | Jouppi | |
| 5,778,422 A | | 7/1998 | Genduso et al. | |
| 6,014,728 A | * | 1/2000 | Baror | 711/133 |
| 6,249,843 B1 | * | 6/2001 | Arimilli et al. | 711/120 |
| 6,675,287 B1 | | 1/2004 | Gaskins et al. | |
| 6,769,052 B2 | | 7/2004 | Chauvel et al. | |
| 2003/0028728 A1 | * | 2/2003 | Ito | 711/118 |
| 2006/0112234 A1 | * | 5/2006 | Cabot et al. | 711/138 |
| 2006/0117143 A1 | * | 6/2006 | Emerson et al. | 711/128 |
| 2007/0079070 A1 | * | 4/2007 | Piry et al. | 711/118 |

* cited by examiner

*Primary Examiner*—Kevin L Ellis
(74) *Attorney, Agent, or Firm*—Joanna G. Chiu; Robert L. King

(57) ABSTRACT

A processing system and method performs allocation of memory cache lines in response to a cache write miss. A processor receives a plurality of data processing instructions. A first store instruction for storing data in a system memory at a predetermined address is decoded by decoding a first specifier within the first store instruction. The first specifier determines an allocation policy for the first store instruction wherein the allocation policy determines whether to store data within the cache when the predetermined address is not within the cache. Additional store instructions are decoded. For example, a second specifier determines an allocation policy for a second store instruction. The specifier in each of the store instructions may be implemented in various forms to provide a policy indicator for each store instruction. No allocation policy may also be established on a per-access basis.

18 Claims, 2 Drawing Sheets

SELECTIVE CACHE LINE ALLOCATION INSTRUCTION EXECUTION AND CIRCUITRY

FIELD OF THE INVENTION

The present invention relates generally to data processing systems, and more specifically, to selective cache line allocation instruction execution in a data processing system.

RELATED ART

Many data processing systems today utilize static cache line allocation policies. That is, in these data processing systems, write misses in the cache either never allocate a new cache line, or conversely, they always allocate a cache line on a write miss. However, neither policy results in optimum system performance.

BRIEF DESCRIPTION OF THE DRAWINGS

The present invention is illustrated by way of example and not limited by the accompanying figures, in which like references indicate similar elements, and in which.

Figure 1:
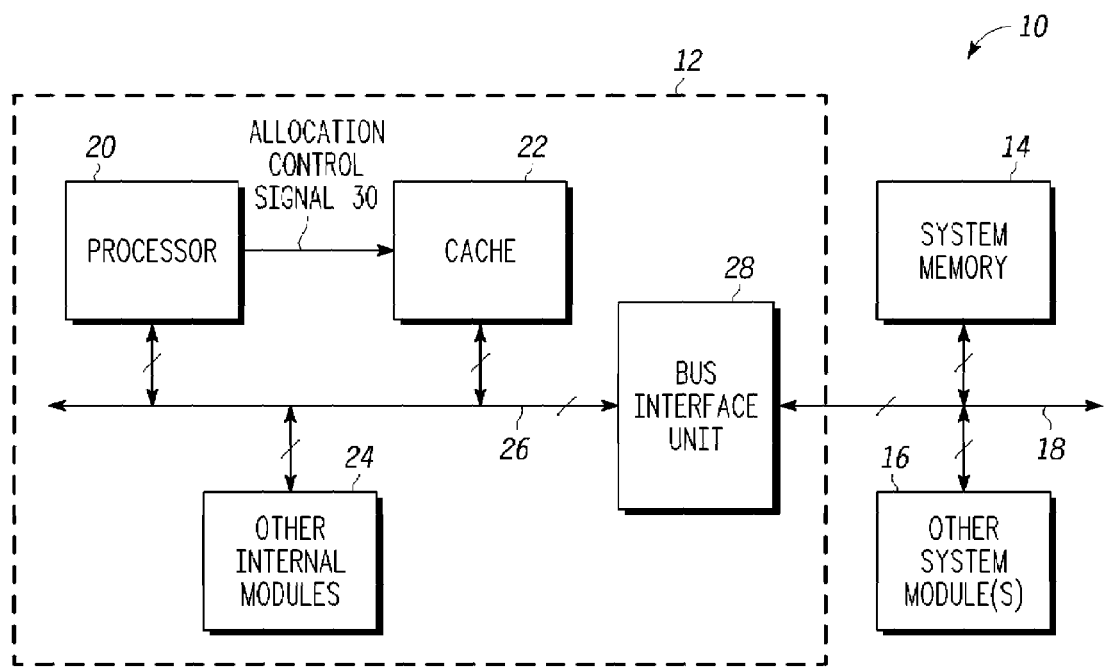
FIG. 1 illustrates, in block diagram form, a data processing system in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

One embodiment of the present invention allows for system performance to be improved by allowing an allocation policy for write accesses to be dynamically selected, or selectively overridden, through the use of a processor store instruction. For example, not all write accesses desire allocation on a cache miss; however, there may be a benefit to performing a write allocation when a subsequent processor load access targets the same data or spatially adjacent data with temporal locality. Therefore, one embodiment of the present invention provides for allocation control on a per-access basis. For example, one embodiment uses an allocation policy specifier within one or more types of processor store instructions which controls the allocation policy of cache lines on write misses in the cache. Through the use of an allocation policy specifier, the allocation may be specified directly within a processor store instruction or may selectively override a static allocation policy. Thus, as will be described in more detail below, one embodiment uses an allocation policy specifier within one or more processor store instructions to control whether, on a write miss to a cache or other storage device, to allocate a new line for store data in the cache or storage device, or whether to pass the store data to memory without allocating a new line.

Referring to FIG. 1, in one embodiment, a data processing system 10 includes an integrated circuit 12, a system memory 14 and one or more other system module(s) 16. Integrated circuit 12, system memory 14 and one or more other system module(s) 16 are connected via a multiple conductor system bus 18. Within integrated circuit 12 is a processor 20 that is connected to a cache 22 via a multiple conductor internal bus 26. Processor 20 also provides an allocation control signal 30 to cache 22. Also connected to internal bus 26 are other internal modules 24 and a bus interface unit 28. Bus interface unit 28 has a first multiple conductor input/output terminal connected to internal bus 26 and a second multiple conductor input/output terminal connected to system bus 18. It should be understood that data processing system 10 is exemplary. Other embodiments include all of the illustrated elements on a single integrated circuit or variations thereof.

In operation, integrated circuit 12 performs predetermined data processing functions wherein processor 20 executes processor instructions and utilizes the other illustrated elements in the performance of the instructions. To make quick memory reads and writes, cache 22 is used. Should the information being read or written by processor 20 not be in cache 22, system memory 14 is accessed. Since system memory 14 is further removed from processor 20 than cache 22, accesses to system memory 14 are slower and are thus desired to be minimized. Allocation control signal 30 is provided by processor 20 to indicate to cache 22 whether or not a new cache line is to be allocated for the currently executing store instruction if the currently executing store instruction results in a cache miss. Allocation control signal 30 will be further described in reference to FIGS. 2-4 below.

Figure 2:
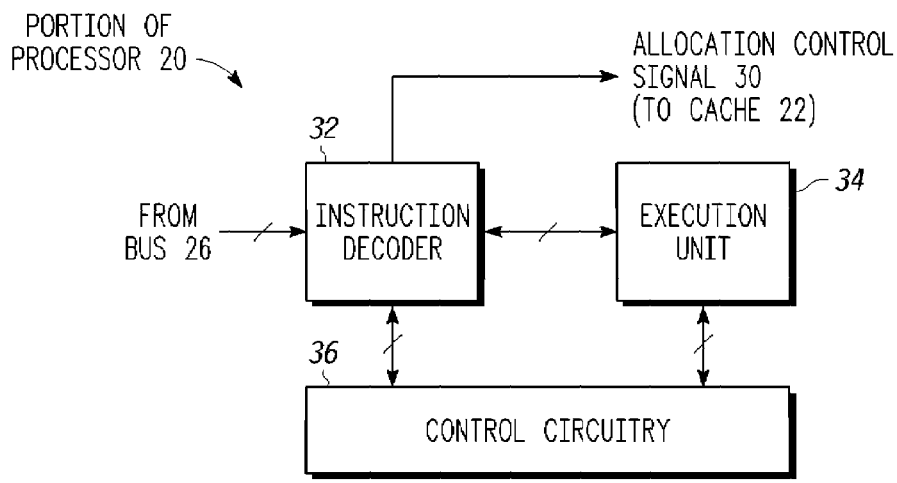
FIG. 2 illustrates, in block diagram form, a portion of a processor of FIG. 1 in accordance with one embodiment of the present invention.

FIG. 2 illustrates a portion of processor 20 in accordance with one embodiment of the present invention. Processor 20 includes an instruction decoder 32 coupled to receive instructions via bus 26 and to provide allocation control signal 30 to cache 22. Processor 20 also includes an execution unit 34 coupled to instruction decode 32, and control circuitry 36 coupled to instruction decoder 32 and execution unit 34. Control circuitry 36 includes circuitry to control the decoding and execution of instructions by instruction decoder 32 and execution unit 34. Instruction decoder 32 receives instructions, such as, for example, into an instruction buffer. Each instruction gets decoded and then executed accordingly by execution unit 34. If instruction decoder 32 is decoding a processor instruction which includes or provides an allocation policy specifier, instruction decode 32 provides allocation control signal 30 accordingly to cache 22. Operation of execution unit 34 and control circuitry 36 is known in the art and will not be described in more detail herein. Operation of instruction decoder 32 will only be described to the extent necessary to describe generation of allocation control signal 30 since the rest of instruction decoder 32 may operate as known in the art.

Figure 3:
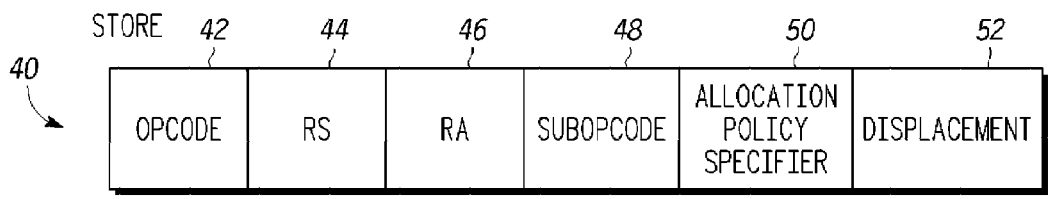
FIG. 3 illustrates a store instruction executed by the processor of FIG. 2, in accordance with one embodiment of the present invention.

FIG. 3 illustrates an example of a store processor instruction 40. Store instruction 40 includes an opcode 42, a source register (RS) 44, a base address register (RA) 46, a subopcode 48, an allocation policy specifier 50, and a displacement 52. Opcode 42 and subopcode 48 can are used to indicate the particular type of store instruction. RS 44 indicates a register (such as a general purpose register of processor 20) which includes data to be stored in a memory, such as system memory 14. The combination of RA 46 and displacement 52 are used to indicate where in system memory 14 the data in the register indicated by RS 44 is to be stored. For example, RA 46 may indicate one of the general purpose registers of processor 20 which stores a base address value. Displacement 52 (which, in one embodiment, may be a positive or negative value) is then added to the base address value to provide the destination address for the store.

Store instruction 40 also includes allocation policy specifier 50. This specifier can be a separate field within store instruction 40, or can be a portion of another field of store instruction 40 (such as, for example, by overloading opcode fields). For example, specifier 50 can be provided as part of opcode 42, subopcode 48, RA 46, or displacement 52. In one embodiment, specifier 50 is a particular bit of instruction 40 which may be its own separate field or a bit of another field of store instruction 40. Note that store instruction 40 is only one example of a processor store instruction. Other types of store instructions may also include an allocation policy specifier such as specifier 50. Also, the store instruction can have many different formats and use any other type of addressing mode. Also, a processor instruction which includes a store operation, but is not explicitly a store instruction, may also include an allocation policy specifier. Also, in another embodiment, an allocation policy specifier may be provided by using a subset of instruction opcodes to indicate that allocation is or is not to be performed. In this manner, an allocation policy can be provided based on the instruction type itself.

In one embodiment, allocation policy specifier 50 allows for the indication of an allocation policy to be used for instruction 40. For example, if specifier 50 is a single bit, then a first value of the bit can indicate that allocation (e.g. allocation of a new cache line) should occur upon a cache miss while a second value of the bit can indicate that no allocation should occur upon a cache miss. In this manner, an instruction which includes an allocation policy specifier can cause cache 22 to implement a different allocation policy than a different instruction which also includes an allocation policy specifier. In another example, allocation policy specifier 50 can be used to indicate whether an existing allocation policy (such as, for example, a default allocation policy for cache 22) is to be overridden or not. For example, if specifier 50 is a single bit, then a first value of the bit can indicate that the existing allocation policy should be used and not be overridden upon a cache miss while a second value of the bit can indicate that the existing policy should be overridden. If the existing policy indicates no allocation, then allocation policy specifier can be used to override this policy of no allocation and thus perform allocation for that particular instruction. In this manner, regardless of which of these methods is used, specifier 50 can be used to change an allocation policy of cache 22 on a per-instruction or per-access basis.

Figure 4:
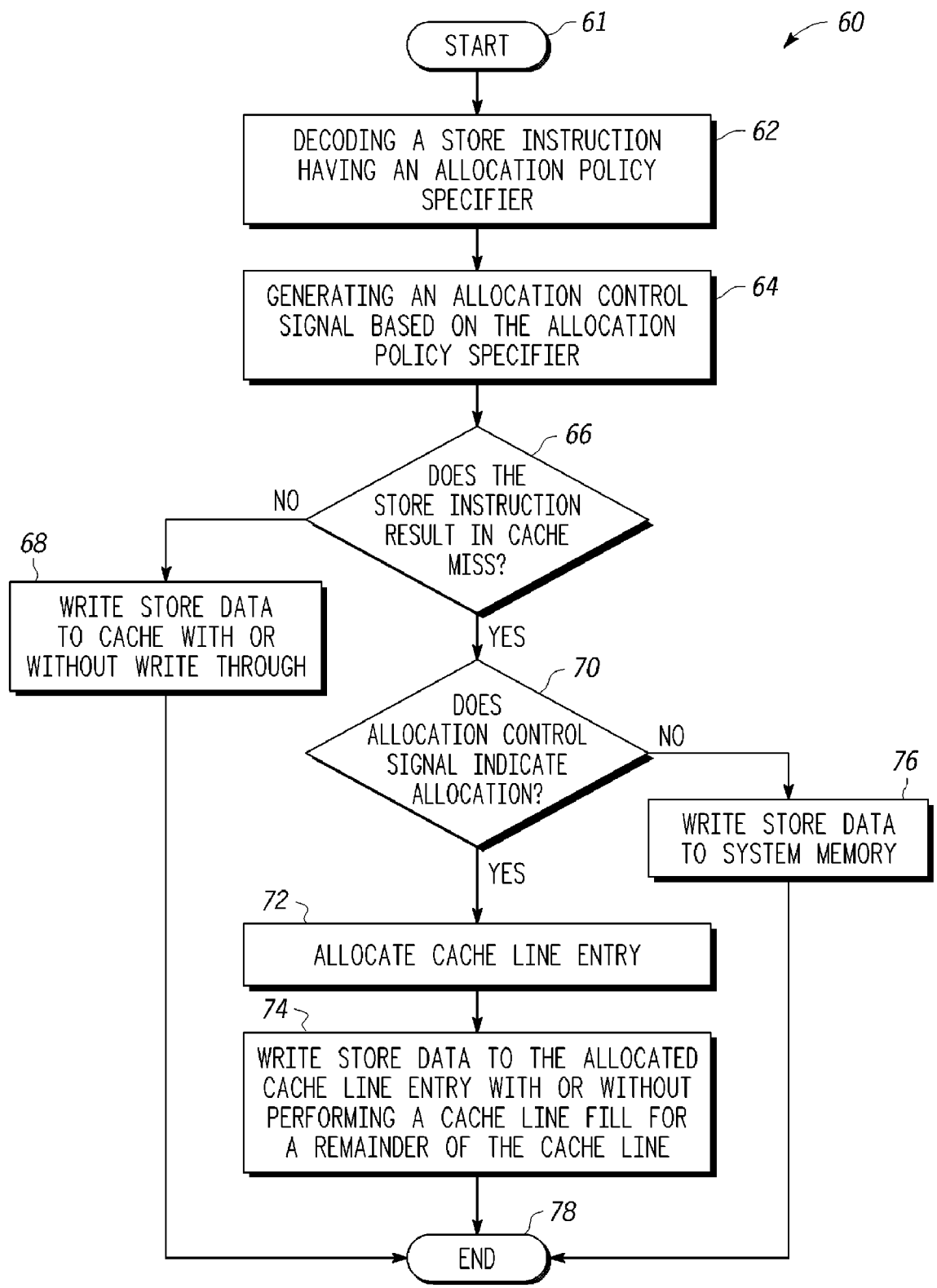
FIG. 4 illustrates, in flow diagram form, a method for execution store instructions, in accordance with one embodiment of the present invention.

FIG. 4 provides an example of the execution of a store instruction including an allocation policy specifier, such as store instruction 40 with allocation policy specifier 50. Flow 60 begins with start 61 and proceeds to block 62 where a store instruction having an allocation policy specifier (such as instruction 40) is decoded (by, for example, instruction decoder 32). Flow proceeds to block 64 where an allocation control signal, such as allocation control signal 30, is generated based on the allocation policy specifier. That is, as discussed above, allocation policy specifier 50 indicates what allocation policy is to be used. For example, specifier 50 can indicate whether or not allocation is to occur. Allocation control signal 30 is generated to provide this information to cache 22.

Flow then proceeds to decision diamond 66 where it is determined whether the store instruction results in a cache miss. If the destination address of the store instruction falls within the cache, i.e. results in a cache hit, then flow proceeds to block 68 where the store data to be written by the store instruction is written to cache, such as cache 22. The writing to the cache can be performed with or without a write through to system memory, as known in the art. For example, if it is performed with write through, the data is stored in system memory 14 as well as cache 22. If it is performed without write through, then it is only written to cache 22, until some later time when cache 22 is used to update system memory 14. Flow then ends at end 78.

If, at decision diamond 66, the store instruction results in cache miss (i.e. the destination address of the store instruction does not hit within the cache), then flow proceeds to decision diamond 70. At decision diamond 70, it is determined whether allocation control signal 30 indicates allocation. That it, depending on the value of allocation policy specifier 50, allocation control signal 30 is generated to either indicate allocation or no allocation for the particular access, i.e. for the particular store instruction that was decoded in block 62.

If allocation control signal 30 indicates allocation, flow proceeds to block 72 where a cache line entry in cache 22 is allocated for the store data to be stored by the store instruction. The method of allocation, such as which entry to allocate each time in cache 22, can be determined using known methods such as round robin, least recently used, etc. Flow then proceeds to block 74 where the store data to be stored by the store instruction is written to the allocated cache line. The writing of the store data to the allocated cache line can be done with or without performing a cache line fill for the remainder of the cache line. For example, in one embodiment, the store data is simply written to the allocated cache line and the process ends at end 78. In another embodiment, the store data can be combined with more data from system memory 14 located adjacent to the store instruction destination address to fill the cache line. In yet another embodiment, the store data can be written to the allocated cache entry and additional data from system memory 14 can then be used to fill the remainder, if any, of the cache line. Flow then ends at end 78. Note that the store data written to cache 22 in block 74 eventually gets stored to system memory 14 (or other memory corresponding to the store instruction destination address) at some later point when system memory 14 gets updated with data in cache 22.

If, at decision diamond 70, allocation control signal 30 indicates no allocation, flow proceeds to block 76 where the store data is written to system memory 14. Note that in this case, since there is no allocation, the store data is not written to cache 22. Flow then ends at end 78.

Therefore, the flow of FIG. 4 provides an example of how an allocation policy specifier, such as specifier 50, can be used to provide an allocation policy for a particular store instruction or to provide an override of an existing default allocation policy. In this manner, the allocation policy used within cache 22 for cache misses can differ from one store instruction to the next. For example, flow 60 can subsequently be performed with a different store instruction which has an allocation policy specifier that is different and independent from the one in the store instruction that was previously executed. This different store instruction can therefore be executed using a different allocation policy than the one used for the store instruction that was previously executed.

Also, note that the above examples and flow 60 of FIG. 4 were described in reference to providing an allocation policy for deciding whether or not to allocate an entry in cache 22 on a cache miss. However, the above descriptions also apply to other storage devices and is not limited to caches. For example, an allocation policy specifier can be used to provide an allocation policy for a data buffer or other type of storage device. In this case, the allocation policy specifier would indicate whether or not the store data is to be stored into the data buffer or other type of storage device or whether it should simply be written to memory, such as system memory 14, without writing it to the data buffer or other type of storage device. Note also that the above descriptions were provided with respect to system memory 14; however, the above descriptions would apply to any other memory within data processing system 10 or IC 12, where this memory can also be cached.

In one embodiment, a method includes providing a system memory, a storage device and a processor for receiving a plurality of data processing instructions, and decoding a first store instruction for storing data in the system memory at a predetermined address by decoding a first specifier within the first store instruction. The first specifier determines an allocation policy for the first store instruction wherein the allocation policy determines whether to store the data within the storage device when the predetermined address is not within the storage device.

In a further embodiment, the method includes decoding a second store instruction within the plurality of data processing instructions by decoding a second specifier within the second store instruction, the second specifier determining the allocation policy for the second store instruction, and setting a value of the second specifier different from the first specifier to make the allocation policy for the first store instruction to be different from the allocation policy for the second store instruction.

In another further embodiment, the method includes providing the first specifier within a predetermined field of the first store instruction.

In another further embodiment, the method includes providing the first specifier as a bit of a base register specifier of the first store instruction.

In another further embodiment, the method includes providing the first specifier as a bit within a displacement field of the first store instruction.

In another further embodiment, the method includes implementing the first specifier as a portion of the opcode of the first store instruction.

In another further embodiment, the method includes overriding a static default cache line allocation of the processor with the first specifier of the first store instruction.

In another further embodiment, the first specifier establishes no cache line allocation for the processor.

In another embodiment, a system includes a processor, a communication bus, a system memory coupled to the processor via the communication bus, and control circuitry coupled to the processor and system memory for decoding a specifier within a first store instruction received by the processor. The first store instruction specifies an address in the system memory for storage of data, and the specifier determines an allocation policy where the allocation policy determines whether to store the data within the storage device when the address is not currently in the storage device, In a further embodiment, the control circuitry decodes a second store instruction by decoding a second specifier within the second store instruction. The second specifier determines the allocation policy for the second store instruction independently from the allocation policy for the first store instruction.

In another further embodiment, the second specifier is different from the first specifier to make the allocation policy for the first store instruction different from the allocation policy for the second store instruction.

In another further embodiment, the first specifier is within a predetermined field of the first store instruction.

In another further embodiment, the first specifier is a predetermined bit of the first store instruction.

In another further embodiment, the first specifier is a bit of a base register specifier of the first store instruction.

In another further embodiment, the first specifier is a bit within a displacement field of the first store instruction.

In another further embodiment, the first specifier is a portion of the opcode of the first store instruction.

In another further embodiment, the first specifier of the first store instruction overrides a static default cache line allocation of the processor.

In another further embodiment, the first specifier establishes no cache line allocation for the processor.

In yet another embodiment, a method includes providing a system memory and a cache memory, coupling a processor to the system memory and the cache memory, and executing a plurality of data processing instructions including a plurality of store instructions for storing information to the system memory. Each of the plurality of store instructions includes cache line allocation policy information for that associated store instruction. The cache line allocation policy information defines whether to store information in the cache memory when a storage address specified by any of the plurality of store instructions is not resident in the cache memory.

In the foregoing specification, the invention has been described with reference to specific embodiments. However, one of ordinary skill in the art appreciates that various modifications and changes can be made without departing from the scope of the present invention as set forth in the claims below. Also, the block diagrams may include different blocks than those illustrated and may have more or less blocks or be arranged differently. Also, the flow diagrams may also be arranged differently, include more or less steps, or may have steps that can be separated into multiple steps or steps that can be performed simultaneously with one another. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method, comprising:
    providing a system memory, a storage device and a processor for receiving a plurality of data processing instructions; and
    decoding a first store instruction for storing data in the system memory at a predetermined address by decoding a first specifier within the first store instruction, the first specifier determining an allocation policy for the first store instruction wherein the allocation policy determines whether to store the data within the storage device when the predetermined address is not within the storage device, and wherein the first specifier is provided as a bit within a displacement field of the first store instruction.

2. The method of claim 1 further comprising:
    decoding a second store instruction within the plurality of data processing instructions by decoding a second specifier within the second store instruction, the second specifier determining the allocation policy for the second store instruction; and
    setting a value of the second specifier different from the first specifier to make the allocation policy for the first store instruction to be different from the allocation policy for the second store instruction.

3. The method of claim 1 further comprising:
    providing the first specifier within a predetermined field of the first store instruction.

4. The method of claim 1 further comprising:
    providing the first specifier as a predetermined bit of the first store instruction.

5. The method of claim 1 further comprising:
    providing the first specifier as a bit of a base register specifier of the first store instruction.

6. The method of claim 1 further comprising:
    implementing the first specifier as a portion of the opcode of the first store instruction.

7. The method of claim 1 further comprising:
    overriding a static default cache line allocation of the processor with the first specifier of the first store instruction.

8. The method of claim 1 wherein the first specifier establishes no cache line allocation for the processor.

9. A system comprising:
    a processor;
    a communication bus;
    a system memory coupled to the processor via the communication bus; and
    control circuitry coupled to the processor and system memory for decoding a first specifier within a first store instruction received by the processor, the first store instruction specifying an address in the system memory for storage of data, the first specifier determining an allocation policy wherein the allocation policy determines whether to store the data within the storage device when the address is not currently in the storage device, and wherein the first specifier is a bit within a displacement field of the first store instruction.

10. The system of claim 9 wherein the control circuitry decodes a second store instruction by decoding a second specifier within the second store instruction, the second specifier determining the allocation policy for the second store instruction independently from the allocation policy for the first store instruction.

11. The system of claim 10 wherein the second specifier is different from the first specifier to make the allocation policy for the first store instruction different from the allocation policy for the second store instruction.

12. The system of claim 9 wherein the first specifier is within a predetermined field of the first store instruction.

13. The system of claim 9 wherein the first specifier is a predetermined bit of the first store instruction.

14. The system of claim 9 wherein the first specifier is a bit of a base register specifier of the first store instruction.

15. The system of claim 9 wherein the first specifier is a portion of the opcode of the first store instruction.

16. The system of claim 9 wherein the first specifier of the first store instruction overrides a static default cache line allocation of the processor.

17. The system of claim 9 wherein the first specifier establishes no cache line allocation for the processor.

18. A method comprising:
    providing a system memory and a cache memory;
    coupling a processor to the system memory and the cache memory; and
    executing a plurality of data processing instructions including a plurality of store instructions for storing information to the system memory, each of the plurality of store instructions including cache line allocation policy information for that associated store instruction that is provided as at least one bit within a displacement field of that associated store instruction, the cache line allocation policy information defining whether to store information in the cache memory when a storage address specified by any of the plurality of store instructions is not resident in the cache memory.

* * * * *